US006887015B1

(12) United States Patent
Blair et al.

(10) Patent No.: US 6,887,015 B1
(45) Date of Patent: May 3, 2005

(54) MARINE BUMPER

(75) Inventors: James F. L. Blair, Shannon, IL (US); Dan Walker, Lanark, IL (US)

(73) Assignee: Saint Technologies, IL, Shannon, IL (US)

(*) Notice: Subject to any disclaimer, the term of this patent is extended or adjusted under 35 U.S.C. 154(b) by 0 days.

(21) Appl. No.: 10/313,127

(22) Filed: Dec. 9, 2002

(51) Int. Cl.[7] ............................ E02B 3/26; B63B 59/02
(52) U.S. Cl. ....................... 405/215; 405/212; 114/219
(58) Field of Search ..................... 405/211, 212–215; 114/218–220

(56) References Cited

U.S. PATENT DOCUMENTS 3,077,175 A * 2/1963 Johnson ....................... 114/219
4,650,389 A * 3/1987 Mulqueen .................... 414/10
2004/0016382 A1 * 1/2004 Aschenbach ................ 114/219

FOREIGN PATENT DOCUMENTS

DE 3224123 * 12/1983
DE 3242511 * 5/1984

* cited by examiner

Primary Examiner—Sunil Singh
(74) Attorney, Agent, or Firm—Kajane McManus

(57) ABSTRACT

The marine bumper comprises a body including two oppositely extending wings which are centrally engaged to a base in a manner to be rotatable relative thereto, such that the wings may be horizontally or vertically oriented. Also, the bumper is adapted for engagement to a cleat of a boat by an extension arm, if such mounting, rather than dock mounting, is desired.

11 Claims, 1 Drawing Sheet

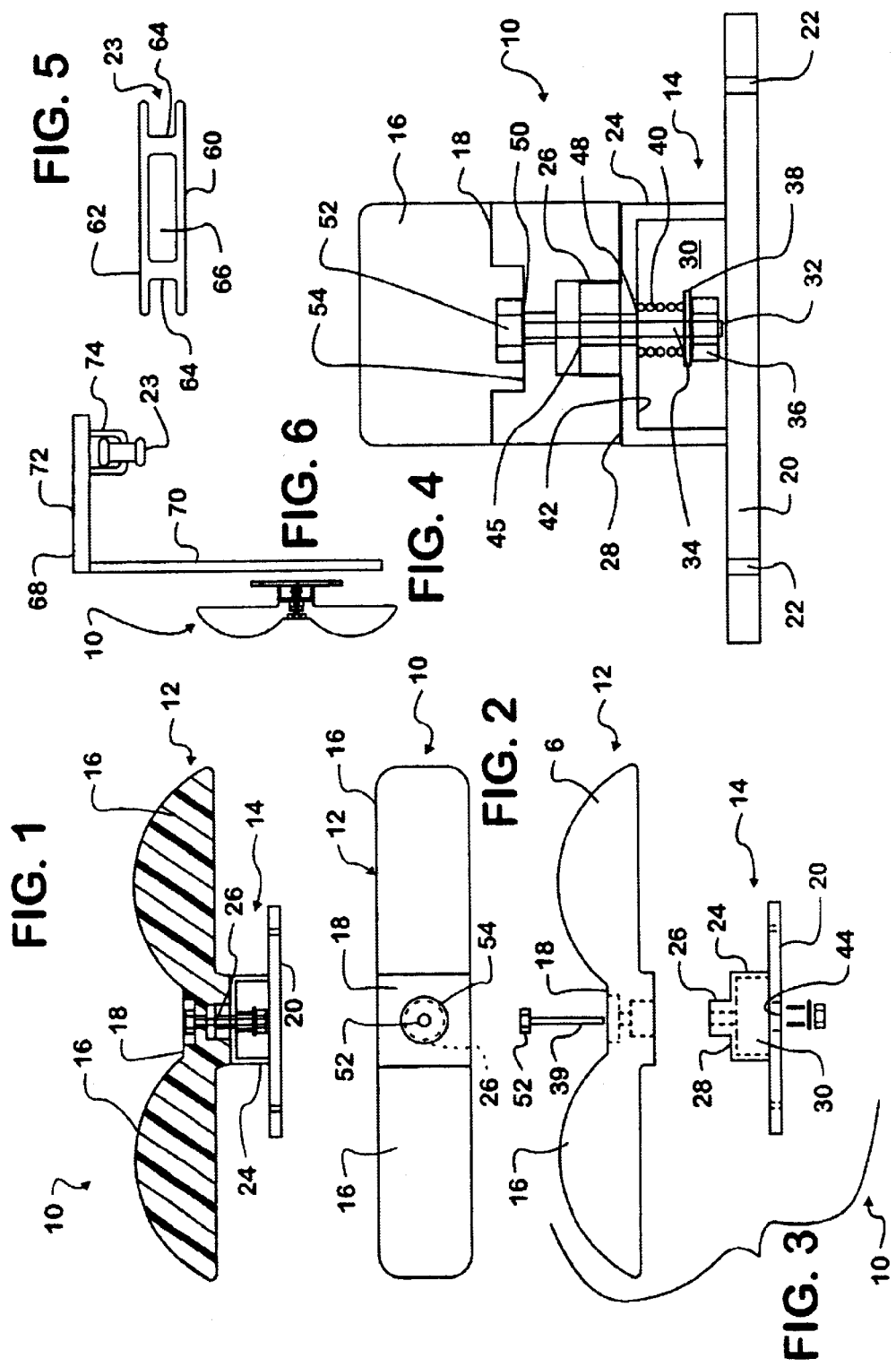

MARINE BUMPER

BACKGROUND OF THE INVENTION

1. Field of the Invention

The present invention relates to a marine bumper. More specifically, the marine bumper can be engaged to a dock or suspended from a cleat of a boat and is rotatable between a vertical and horizontal orientation, as required.

2. Prior Art

Heretofore various marine bumpers and fenders have been proposed for producing adequate spacing between a boat and a dock, pier or piling, to protect the boat from being damaged by such structures which a boat, inherently, must come into contact with from time to time.

However, none of the prior art embodiments provide the versatility or ease of use which, as will be described hereinbelow, the marine bumper of the present invention provides.

SUMMARY OF THE INVENTION

According to the invention there is provided a marine bumper comprising a bumper body rotatably mounted to a mounting base for the bumper.

BRIEF DESCRIPTION OF THE DRAWINGS

FIG. 1 is a cross sectional view through the marine bumper of the present invention.

FIG. 2 is a top plan view of the bumper.

FIG. 3 is an exploded perspective view of the bumper.

FIG. 4 is another cross sectional view through the bumper, taken perpendicularly to that of FIG. 1.

FIG. 5 is a side view of a boat cleat.

FIG. 6 shows the bumper of the present invention mounted to and depending from the boat cleat by an extension arm.

DESCRIPTION OF THE PREFERRED EMBODIMENT

Referring now to the drawings in greater detail, there is illustrated therein a marine bumper made in accordance with the teachings of the present invention and generally identified by the reference numeral 10.

As shown, the bumper 10 includes a bumper body 12 and a mounting base 14 for same.

The bumper body 12 comprises a pair of wing like structures or wings 16 which extend laterally outwardly and upwardly from a center depression 18. The body 12 engages the base 14 along the center depression 18.

The base 14 includes a mounting plate 20 having mounting bores 22 therein for use in mounting same to a dock (not shown) or, if desired to an extension arm (FIG. 6) which engages a cleat 23 of a boat (not shown), if it is desired to engage the bumper 10 to a boat rather than a dock or piling (not shown).

Positioned along the mounting plate 20 at a centered position between the mounting bores 22 is an elevated neck 24 which includes an inwardly stepped elevation 26, which is square in cross section, extending upwardly from a top surface 28 of the neck 24, upon which the body 12 engages.

The elevated neck 24 is hollow, having a cavity 30 therein within which a distal end 32 of a fixation device 34 such as a bolt 34 is received. Fixed onto the distal end 32 is a nut 36 and washer 38, the washer 38 and nut 36 ensnaring a biasing spring 40 positioned about the distal end 32 between the washer 38 and an inner top surface 42 of the elevated neck 24.

In order to allow for seating of the above structures in the cavity 30, the base plate 20 is provided with a centered bore 44 therein, through which the structures are passed into the cavity 30.

The elevation 26 above the neck 24 includes a bore 46 therein which aligns with a bore 48 in the top surface 28 of neck 24, as well as with a bore 50 in the depressed center 18 of the body 12. The bolt 34, of which the terminal end 32 is received and maintained within the cavity 30 of the neck 24, is passed downwardly through the aligned bores 50, 46 and 48, with a head 52 thereof thus holding the depressed center 18 of the body 12 to the base 14.

In a preferred embodiment, the depressed center 18 of the body 12 is provided with a circular indent 54 therein within which the head 52 of the bolt 34 is received in countersunk manner.

To produce rotation between the body 12 and the base 14, a user pulls the body 12 away from the base 14, releasing same from its seat on the square elevation 26, against action of the biasing spring 40 and, after rotation of 90°, releases grasp on the body 12. Under the action of the biasing spring 40, the body 12 reseats onto the elevation 26 on the neck 24.

It will be understood that vertical and horizontal orientation are the two orientations desired for the body 12, the vertical orientation being illustrated in FIG. 6 and the horizontal orientation being understandable from perusal of FIG. 2 which is a head-on view of the bumper 10 when horizontally disposed.

The horizontal position is desired for the bumper 10 when near a piling or the like and at a point after a boat is moored against a dock, so as not to interfere with passengers mounting or dismounting.

The vertical position is desired for the bumper 10 during the time a boat is being brought up to or leaving a dock or pier, and should provide sufficient clearance in the horizontal orientation when dealing with a piling so no contact is made between the boat and such structure, to keep the boat from being damaged thereagainst.

Turning now to FIGS. 5 and 6, it will be seen that the bumper 10 can also be attached to the cleat 23 of a boat in a manner to be suspended therefrom.

FIG. 5 shows the boat cleat 23 to comprise a base 60, a top rail 62, and brackets 64 holding the top rail 62 above the base 60. A void 66 exists in the cleat 24 in the area between the base 60, top rail 62 and brackets 64, to which an angled extension arm 68 can be engaged which, when the bumper 10 is engaged to a depending portion 70 thereof, produces a bumper 10 which is easily mounted to and dismounted from the cleat 23.

In this respect, the arm 68 has a horizontally extending portion 72 which is engageable to the cleat 23 by a suitable connector 74, such as a U-bolt 74 illustrated, the U-bolt passing through the void 66 of the cleat 23 and thus fixing the extension arm 68 thereto. The depending portion 70 of the arm 68 extends a sufficient degree downwardly such that when the bumper 10 is attached thereto, the bumper 10 can serve to keep the boat away from structures which could damage the integrity thereof. This accommodation for mounting to a boat cleat 23 becomes useful when it is not possible or desired to permanently attach the bumper to a dock or the like.

As described above, the bumper 10 of the present invention provides a number of advantages, some of which have been described above and others of which are inherent therein. Also modifications may be proposed to the bumper 10 without departing from the teachings herein. Accordingly, the scope of the invention is only to be limited as necessitated by the accompanying claims.

We claim:

1. A marine bumper comprising a bumper body rotatably mounted to a mounting base, wherein the mounting base comprises a base plate having a centered elevated neck and wherein a square elevation rises from the neck portion, the bumper body releasably on and over the elevation of the mounting base and released from its seating over the elevation when the body and base are manually biased away from each other, the body and base return to a biased together position under action of a biasing spring when they are no longer manually biased away from each other.

2. The bumper of claim 1 wherein the bumper body is engaged to the base by a connector extending through the body and into the base.

3. The bumper of claim 2 wherein the connector is spring biased to maintain the bumper body in a desired position relative to the base.

4. The bumper of claim 1 wherein the mounting base includes a base plate having mounting bores therein.

5. The bumper of claim 1 wherein the bumper body comprises two wings which surround a depressed center therebetween.

6. The bumper of claim 5 wherein each wing extends upwardly from the depressed center in a direction away from said mounting base.

7. The bumper of claim 1 further including an accessory extension arm for use in mounting the bumper to a boat via a cleat on a deck of the boat.

8. The bumper of claim 7 wherein the extension arm includes a horizontal portion and a depending vertical portion.

9. The bumper of claim 8 wherein the mounting base engages the depending vertical portion of the arm.

10. The bumper of claim 8 wherein the horizontal portion is engageable by a suitable connector to the cleat.

11. The bumper of claim 1 wherein the bumper body is rotatable between a horizontal and vertical orientation relative to the base when the body and base are biased away from each other.

* * * * *